(12) United States Patent
Mao et al.

(10) Patent No.: US 11,544,762 B2
(45) Date of Patent: Jan. 3, 2023

(54) TECHNIQUES AND ARCHITECTURES FOR RECOMMENDING PRODUCTS BASED ON WORK ORDERS

(71) Applicant: salesforce.com, inc., San Francisco, CA (US)

(72) Inventors: Yixin Mao, San Francisco, CA (US); Sitaram Asur, San Francisco, CA (US); Na Cheng, San Francisco, CA (US); Gary Brandeleer, San Francisco, CA (US); Kavya Murali, San Francisco, CA (US); Nicholas Beng Tek Geh, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 179 days.

(21) Appl. No.: 16/773,727

(22) Filed: Jan. 27, 2020

(65) Prior Publication Data

US 2021/0150610 A1 May 20, 2021

Related U.S. Application Data

(60) Provisional application No. 62/937,713, filed on Nov. 19, 2019.

(51) Int. Cl.
*G06Q 30/06* (2012.01)
*G06F 17/16* (2006.01)
(Continued)

(52) U.S. Cl.
CPC ......... *G06Q 30/0631* (2013.01); *G06F 17/16* (2013.01); *G06Q 10/06313* (2013.01); *G06Q 10/0875* (2013.01)

(58) Field of Classification Search
CPC .............. G06F 17/16; G06Q 10/06313; G06Q 10/0875; G06Q 30/06–0645; G06Q 30/08; G06Q 50/01; G16Y 10/00–90
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

OTHER PUBLICATIONS

"Cosine Similarity," Wikipedia, the Wikimedia Foundation, Inc.; Nov. 3, 2018, 5pp. https://web.archive.org/web/20181108100304/ https://en.wikipedia.org/wiki/Cosine_similarity (Year: 2018).*

(Continued)

*Primary Examiner* — Adam L Levine
(74) *Attorney, Agent, or Firm* — LKGlobal | Lorenz & Kopf, LLP

(57) ABSTRACT

A system and related processing methodologies for recommending a product based on a work order are described. The system receives an input case description, including a current repair item and a current work type. Historical work orders associating a plurality of products with repair items and work types are searched for a co-occurrence of the repair item matching the current repair item, and the work type matching the current work type. Upon finding a match, the product associated with the match is added to a set of candidate products for the current work order. A similarity measure between the candidate product and current work order description, a current work type category, and popularity of the candidate product is generated and then used in the generation of a probability score for the candidate product and current work order. If the probability score meets a threshold, the candidate product is recommended.

13 Claims, 6 Drawing Sheets

(51) Int. Cl.
    *G06Q 10/08*    (2012.01)
    *G06Q 10/06*    (2012.01)

(56) References Cited

U.S. PATENT DOCUMENTS

| | | | |
|---|---|---|---|
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 * | 2/2005 | Brodersen .............. G06Q 10/06 705/7.14 |
| 6,850,949 | B2 | 2/2005 | Warner et al. |
| 7,062,502 | B1 | 6/2006 | Kesler |
| 7,069,231 | B1 | 6/2006 | Cinarkaya et al. |
| 7,181,758 | B1 | 2/2007 | Chan |
| 7,289,976 | B2 | 10/2007 | Kihneman et al. |
| 7,340,411 | B2 | 3/2008 | Cook |
| 7,356,482 | B2 | 4/2008 | Frankland et al. |
| 7,401,094 | B1 | 7/2008 | Kesler |
| 7,412,455 | B2 | 8/2008 | Dillon |
| 7,508,789 | B2 | 3/2009 | Chan |
| 7,620,655 | B2 | 11/2009 | Larsson et al. |
| 7,698,160 | B2 | 4/2010 | Beaven et al. |
| 7,730,478 | B2 | 6/2010 | Weissman |
| 7,779,475 | B2 | 8/2010 | Jakobson et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,209,308 | B2 | 6/2012 | Rueben et al. |
| 8,275,836 | B2 | 9/2012 | Beaven et al. |
| 8,457,545 | B2 | 6/2013 | Chan |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,045 | B2 | 8/2013 | Rueben et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 10,650,337 | B2 * | 5/2020 | Lalani .............. G06Q 10/06315 |
| 11,017,351 | B2 * | 5/2021 | Sethi .................. G06Q 10/20 |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramanian et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2006/0021019 | A1 | 1/2006 | Hinton et al. |
| 2008/0249972 | A1 | 10/2008 | Dillon |
| 2009/0063414 | A1 | 3/2009 | White et al. |
| 2009/0100342 | A1 | 4/2009 | Jakobson |
| 2009/0177744 | A1 | 7/2009 | Marlow et al. |
| 2011/0247051 | A1 | 10/2011 | Bulumulla et al. |
| 2012/0042218 | A1 | 2/2012 | Cinarkaya et al. |
| 2012/0218958 | A1 | 8/2012 | Rangaiah et al. |
| 2012/0233137 | A1 | 9/2012 | Jakobson et al. |
| 2013/0212497 | A1 | 8/2013 | Zelenko et al. |
| 2013/0218948 | A1 | 8/2013 | Jakobson |
| 2013/0218949 | A1 | 8/2013 | Jakobson |

(56) References Cited

U.S. PATENT DOCUMENTS

| | | |
|---|---|---|
| 2013/0218966 A1 | 8/2013 | Jakobson |
| 2013/0247216 A1 | 9/2013 | Cinarkaya et al. |
| 2020/0097608 A1* | 3/2020 | Xiu ........................ G06N 5/003 |

OTHER PUBLICATIONS

"Random forest," Widipedia, the Wikimedia Foundation, Inc.; Nov. 4, 2018, 9pp. https://web.archive.org/web/20181111075441/https://en.wikipedia.org/wiki/Random_forest (Year: 2018).*

* cited by examiner

TECHNIQUES AND ARCHITECTURES FOR RECOMMENDING PRODUCTS BASED ON WORK ORDERS

CROSS-REFERENCE TO RELATED APPLICATION

This application claims the benefit of U.S. Provisional Application No. 62/937,713, filed Nov. 19, 2019, the entire contents of which are hereby incorporated by reference herein.

TECHNICAL FIELD

Embodiments relate to techniques for sorting products in a product database. More particularly, embodiments relate to techniques for automatically recommending products based on components of a work order.

BACKGROUND

Field service technicians generally receive work orders for cases and must make a determination as to what products and tools to bring with them to resolve the case. The work order description may identify a repair item and include a description of the problem. Using this information, the field service technician generally selects one or more products to bring with him, from among a potentially complex plurality of available products. It can be difficult, burdensome, and time consuming to determine which of the available products to bring.

Accordingly, it is desirable to have techniques and architectures that can be used to efficiently and effectively recommend products based on the work order. In addition, it is desirable that the techniques and architectures employ machine learning to train and adjust to the work orders and products over time. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In the following description, numerous specific details are set forth. However, embodiments of the invention may be practiced without these specific details. In other instances, well-known structures and techniques have not been shown in detail in order to avoid obscuring the understanding of this description.

As mentioned, each time a field service technician receives a work order for a case, he must make a determination as to what products and tools to bring to resolve the case. The technical problem of using available techniques and systems to select one or more products to bring to resolve the case can manifest itself in several ways. First, selecting one or more products to bring to resolve the case, from among a potentially complex plurality of available products, can be a time consuming and unreliable process, leading to a lower first time fix rate. Additionally, not having all of the necessary products on the first customer visit can increase the number of field trips/cost per customer to resolve the case.

Various embodiments provide technical solutions to these problems in the form of techniques and architectures that efficiently and effectively recommend products based on the work order. The provided embodiments generate a ranked list of recommended products to bring, each with a respective confidence score, to resolve a given work order. Additionally, the provided embodiments employ machine learning and adjust to nuances in products used for types of repairs and repair products over time. The provided product recommendations can help field service technicians bring as many needed products as possible, improving first-time fix rates and reducing the number of field trips/cost per customer to resolve the case. The provided embodiments are described in more detail below.

Figure 1:
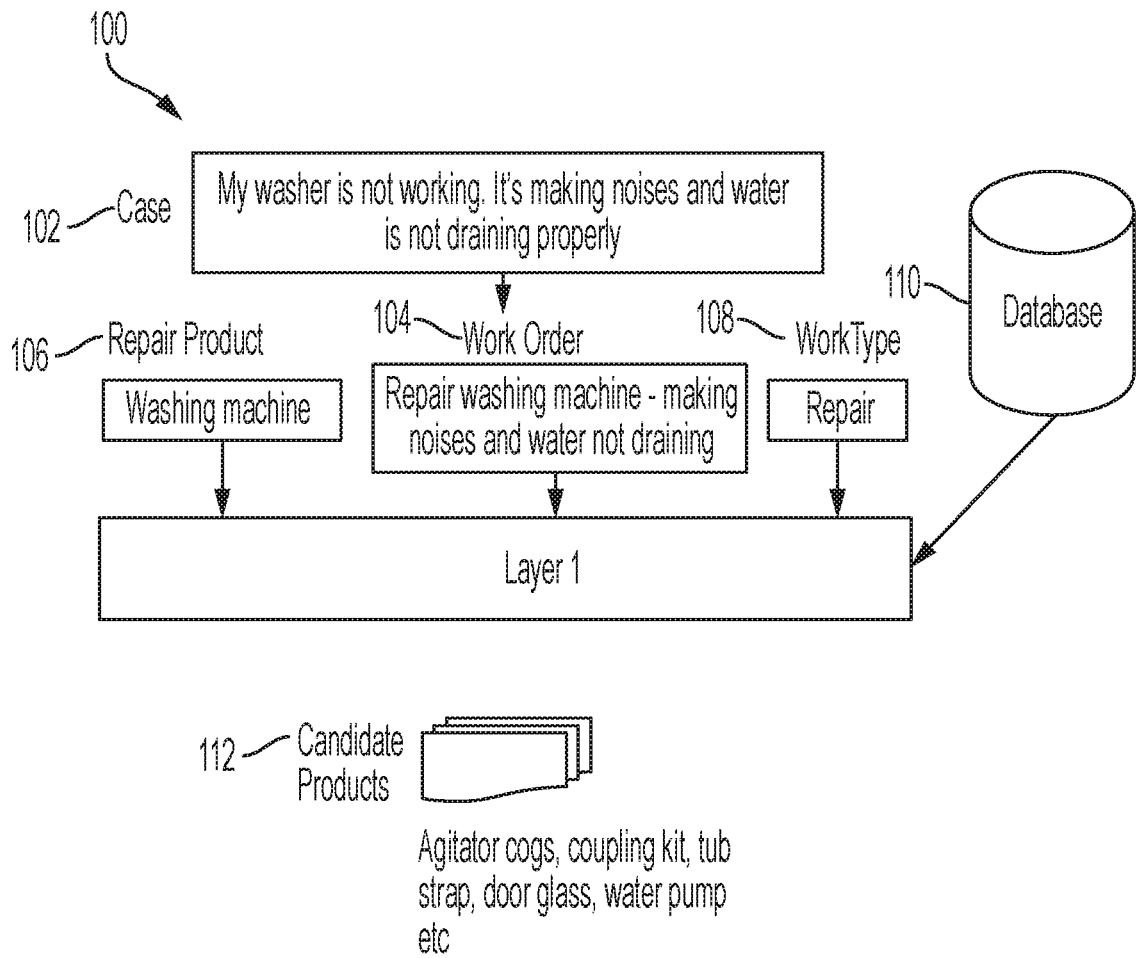
FIG. 1 depicts a first stage of data flow for a product recommender system, in accordance with various embodiments.

FIG. 1 depicts a first stage of data flow for a product recommender system 100. The product recommender system 100 recommends a product from among a plurality (M) of different products. A processor (FIG. 6, 612A) of the product recommender system 100 receives, from an input system (FIG. 6, 612C), an input case description 102, and a current work order 104. The current work order 104 characterizes the input case description and includes at least the following fields: a current work order description, a current repair item 106 (also referred to as a repair product), and a current work type 108. In a non-limiting example, the input case description 102 may be "my washer is not working. It's making noises and water is not draining properly;" the related current work order includes "[repair] [washing machine] [making noises and water not draining]." In this example, washing machine is the repair item 106, and repair is the work type 108. Other non-limiting examples of work type 108 may include replace and calibrate.

As mentioned, the field technician receives the work order and case information and has the technical problem of determining what products from among M potential products, to take along to resolve the case (e.g., to repair the washing machine). With respect to the provided example, non-limiting examples of the M products may include agitator cogs, coupling kits, tub straps, door glass, a water pump, and the like. In the provided embodiments, the processor accesses a storage device (database 110, tenant data storage FIG. 5, 622) containing information about the M products for a given tenant or client. The storage device has stored therein historical work orders for the M products, each product of the M products having associated therewith at least one historical work order associating the product with a historical repair item, a historical work type, and a historical work order description. As may be appreciated, the storage device may have additional products, i.e., more than the M products stored therein. In an example, the information in the storage device may be arranged as shown in Table 1, below.

TABLE 1

| Historical Work Order | Historical Work Type | Historical Repair Item | Product from among M products |
| --- | --- | --- | --- |
| WO1 | A | B | Product 1 |
| WO2 | A | C | |
| WO3 | A | B | Product 1, Product 2 |
| ... | | | |

For this example, the product represents a product consumed when performing work type on the repair item. As such, the product can be one product (as in WO1), zero products (as in WO2), and more than one product (as in WO3). Each product, such as Product 1, can be present in more than one work order; said differently, the number of work orders and the number of products need not be the same. It may be appreciated that the associations illustrated by the rows and columns arrangement of Table 1 can be depicted in other arrangements in the data storage.

The processor searches the historical work orders for a match. In various embodiments, a match is defined as a historical work order having a co-occurrence of the historical repair item matching the current repair item, and the historical work type matching the current work type. In a non-limiting example, the current work order has repair item B and work type A, and the processor searches the historical work orders for matches to work type A and repair item B. In the example, there are two matches, WO1 and WO2. Regardless of the type of matching process performed, upon finding a match, the processor adds the product associated with the match to a set of candidate products for the current work order, thereby generating N candidate products for the current work order. If only one matching product is found, then N=1; if the search identifies different matching products, then N>1; and, if the search does not identify any matching products, then N=0.

Continuing with the example, for the match in WO1, product 1 is added to the list of candidate products for the current work order 104; and, for the match in WO2, product 1 and product 2 are added to the list of candidate products for the current work order 104. At this point, it can be observed that product 1 may be added twice. Therefore, in various embodiments, generating the N candidate products further includes determining whether the product associated with the match is already in the set of candidate products for the current work order, and not adding the product a second time when it is already in the set of candidate products for the current work order. Next, each of the N candidate products is assigned a probability score.

Figure 2:
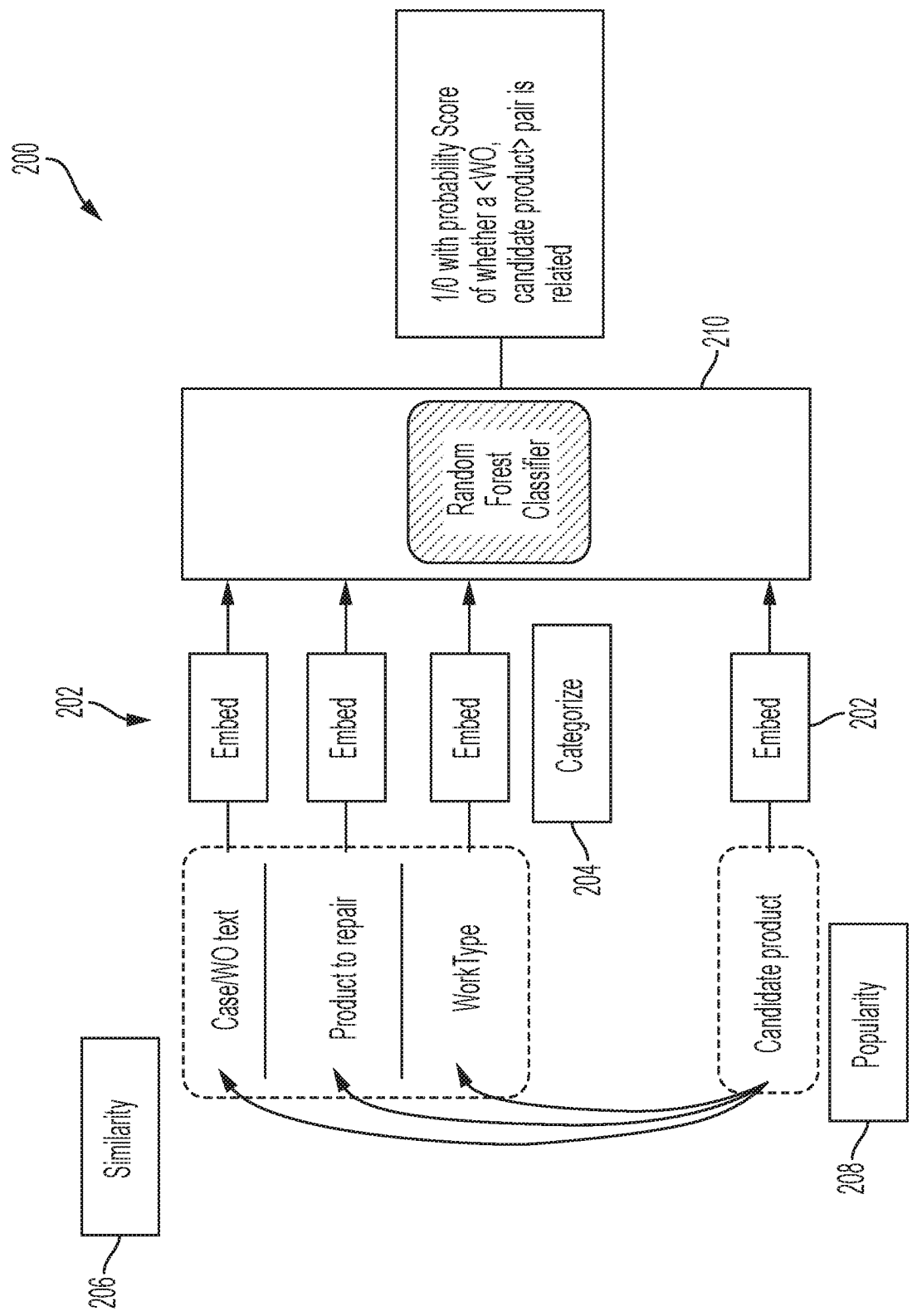
FIG. 2 depicts generation of a probability score, in accordance with various embodiments.

FIG. 2 depicts generation 200 of the probability score for a <candidate product—current work order> pair, in accordance with various embodiments. The probability score may also be referred to as a confidence score, and the probability score may be used to rank the recommended candidate products. As mentioned, the current work order 104 includes the following fields: a current work order description, a current repair item 106 (also referred to as a repair product), and a current work type 108. The processor converts natural language text of each of the fields of the current work order 104 into a numerical vector in a process called embedding 202.

In various embodiments, the work type 108 is further assigned a work type category 204. The work type category is a superset of the work type; therefore, in practice, the work type category and work type can be the same; for example, a work type category of repair may include (a) a work type <repair> as related to a refrigerator and (b) a work type <repair> as related to a furnace. In another example, work type category of calibrate can include more than one work type, such as, (a) a work type <digital calibration>, and (b) a work type <pressure calibration>. The natural language text of the candidate product is also embedded/converted 202 into a numerical vector. In various embodiments, the converting process is performed using a weighted pre-trained word embedding method.

For each of the N candidate products for the current work order, the processor determines a respective: similarity measure 206 between the historical work order description and the candidate product, category of the current work type, and popularity 208 of the candidate product, popularity being measured as a frequency of occurrence of the candidate product among all historical work orders.

In some embodiments, determining the similarity measure between the candidate product and the current work order description includes using a metric called a cosine similarity and determining a cosine similarity between the current work order description and the candidate product. In some embodiments, determining the similarity measure between the candidate product and the current work order description includes determining an overlapping word count between the current work order description and the candidate product.

For each of the N candidate products for the current work order, generating a respective probability score for the candidate product and current work order is based at least on the similarity measure 206, work type category 204, and popularity 208 of the candidate product. In various embodiments, the probability score for the candidate product and current work order is also be based on the numerical vectors from the embedding process. The probability score generated for each of the N candidate products is a number between zero and one, an outcome of one indicating a positive relationship between the candidate product and the current work order, and an outcome of zero indicating a negative relationship between the candidate product and the current work order. In various embodiments, generating the respective probability score is performed in a second stage of data flow in the product recommender system. In various embodiments, a machine learning classification model 210 is used to generate the respective probability score. In various embodiments, the classification model 210 is a Random Forest Classifier.

Figure 3:
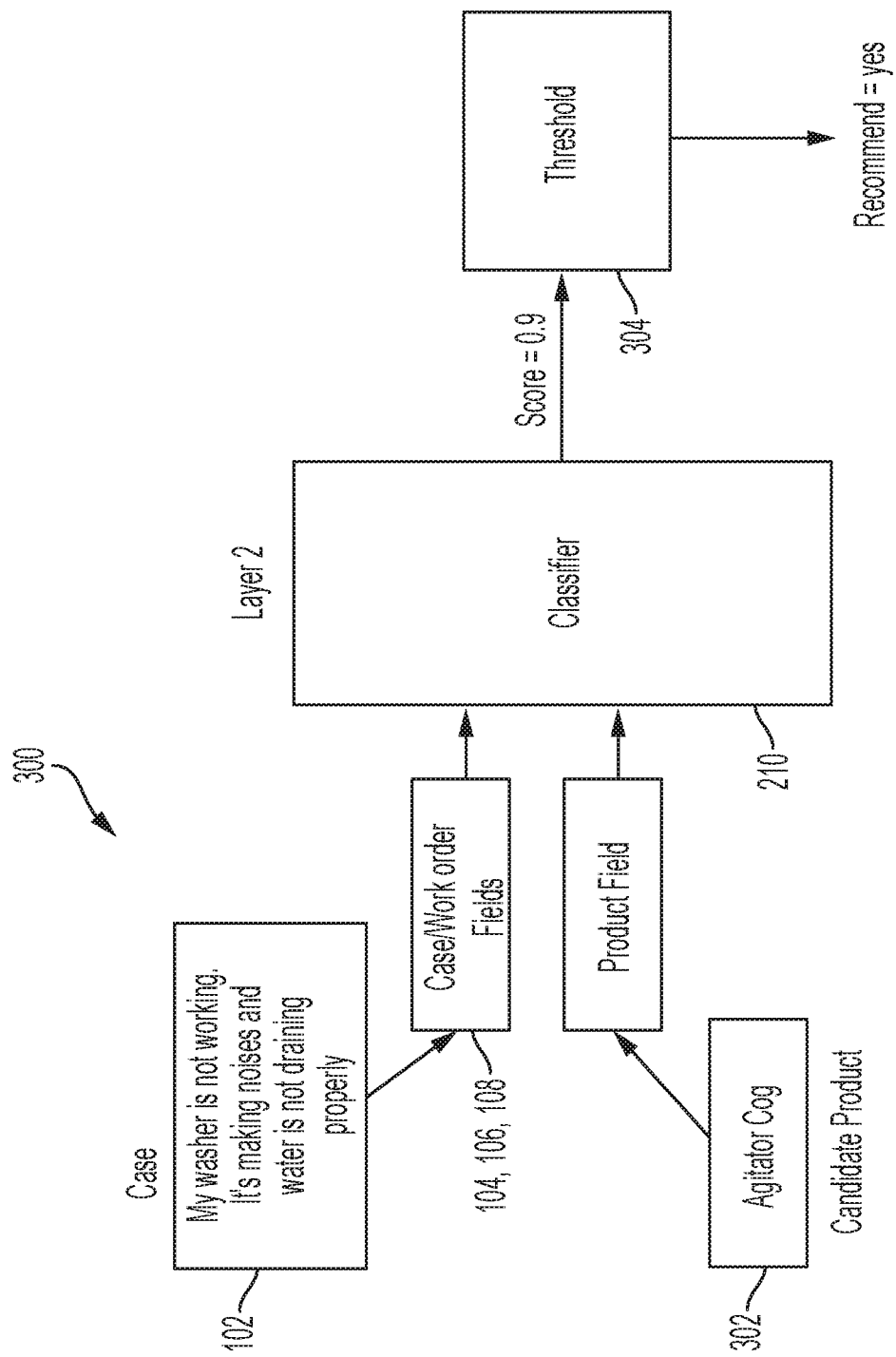
FIGS. 3-4 illustrate a second stage of data flow for a product recommender system, in accordance with various embodiments.
Figure 4:
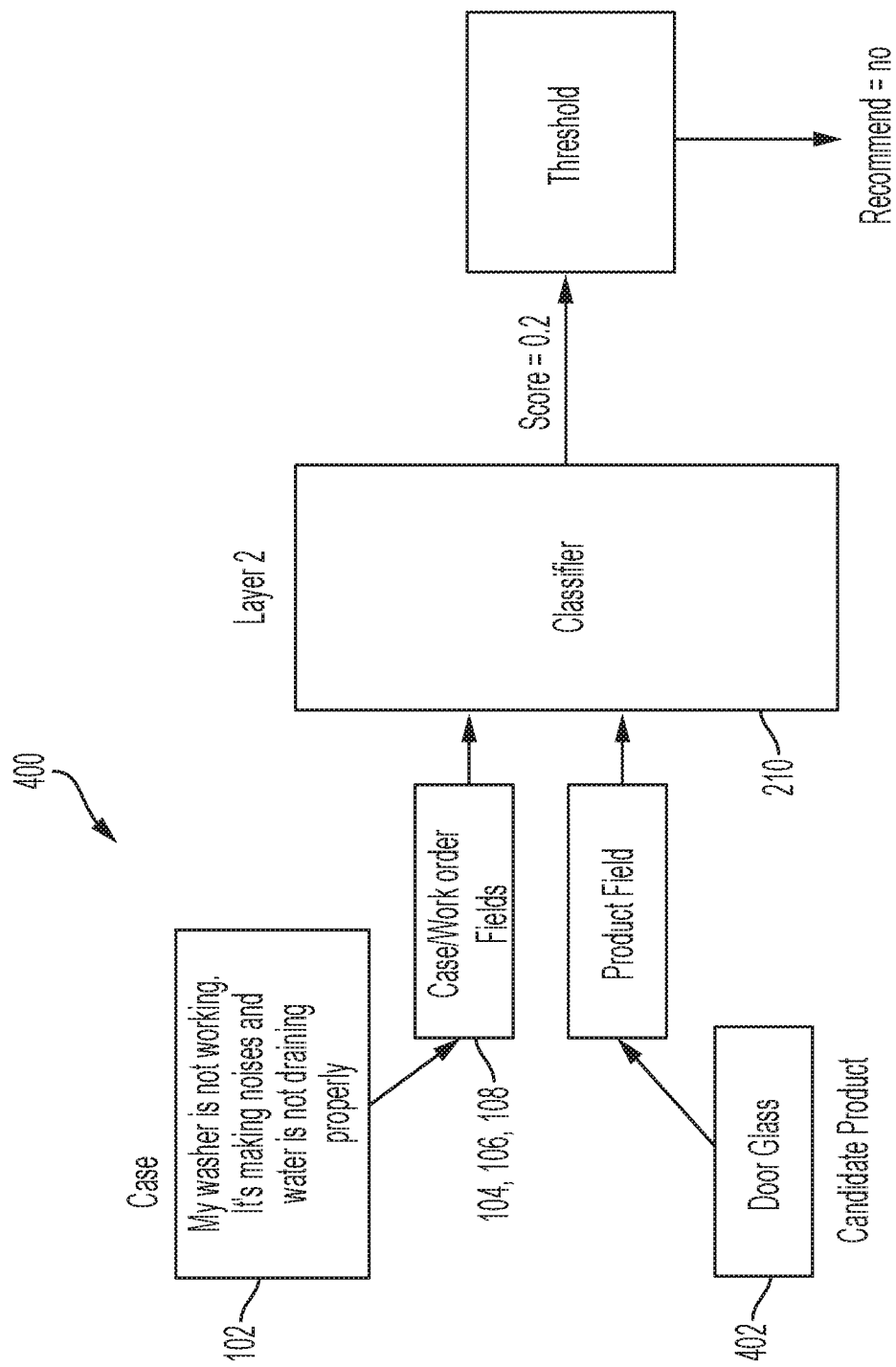

Turning now to FIGS. 3-4, and with continuing reference to FIGS. 1-2, the second stage of data flow for various embodiments of the product recommender system is described using an example. In the example of FIG. 3, the candidate product 302 is an agitator cog and second stage 300 depicts the classification model 210 generating a probability score of 0.9. A thresholder 304 compares the input probability score to a pre-programmed threshold before determining to recommend or not to recommend the candidate product 302. In this example, the score of 0.9 meets (or exceeds) the pre-programmed threshold, and the product recommender system 100 outputs an affirmative recommendation for the candidate product 302.

In the example of FIG. 4, the candidate product 402 is door glass, and second stage 400 depicts the classification model 210 generating a probability score of 0.2. The thresholder 304 compares the input probability score to the pre-programmed threshold before determining to recommend or not to recommend the candidate product 402. In this example, the score of 0.2 does not meet, or is below, the pre-programmed threshold, and the recommender system 100 outputs a negative recommendation for the candidate product 402.

Figure 5:
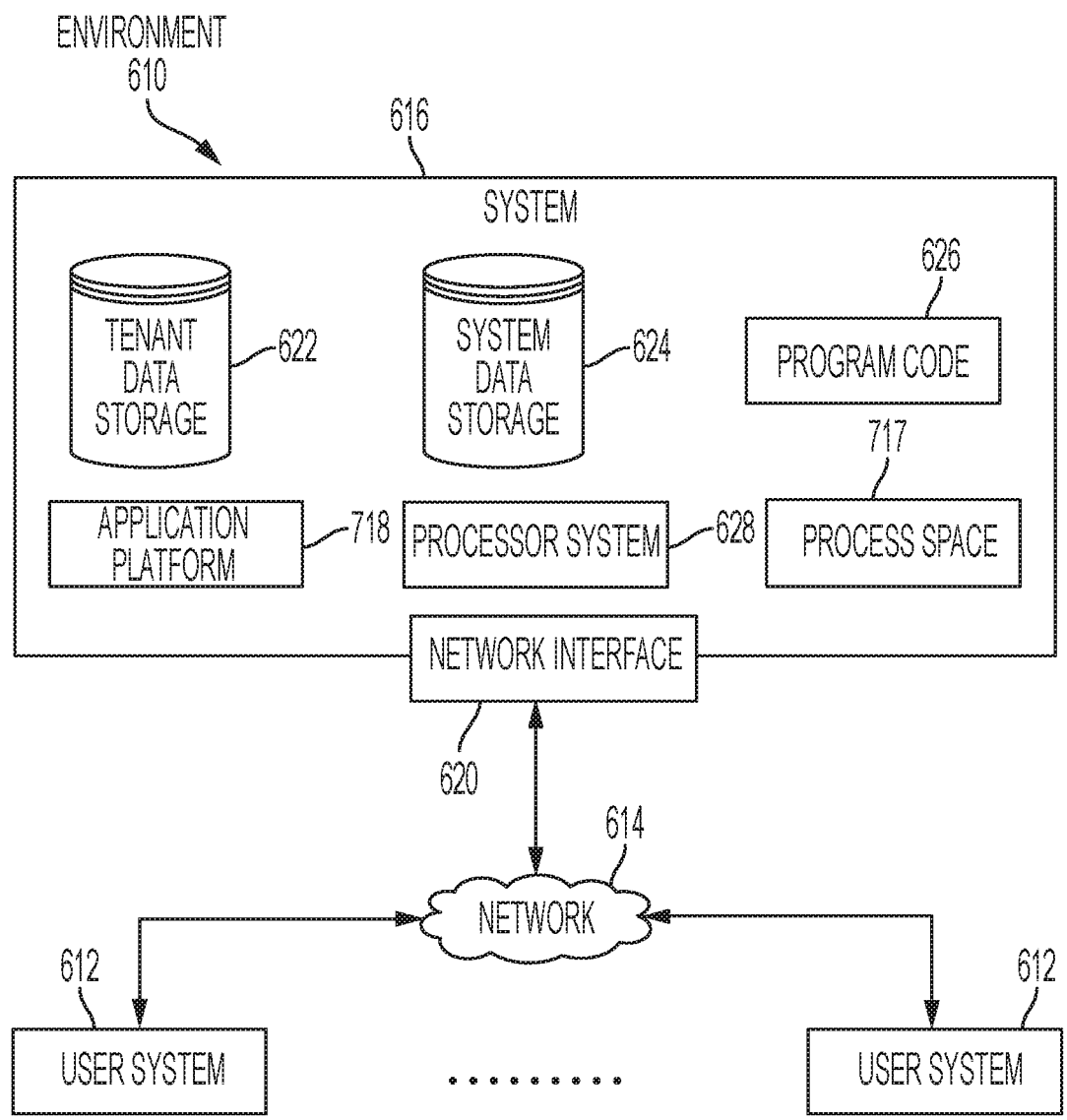
FIG. 5 is a block diagram representation of an exemplary environment in which the product recommender system might be used.

As may be appreciated, the first and second stages may be implemented in hardware or software. In various embodiments, the process steps in the first and second stages may be performed by a processor executing a product recommender algorithm stored as program code (FIG. 5, 626). Aspects of the classification model 210 may embody machine learning. As such, the classification model 210 may be trained and evaluated.

In various embodiments, the classification model may be trained as follows. The processor may obtain a set of completed work orders that were stored over a duration of time. The completed work orders include information about actual repairs; accordingly, completed work orders include an actual work order description, an actual repair item, and an actual work type, the completed work order having used at least one actual product that is one of the M products. The processor may duplicate a first percentage of the completed work orders into a valid training set. Henceforth, the valid training set members are defined as valid training work orders including an actual work order description, an actual repair item, an actual work type, and at least one valid training actual product. The processor assigns the valid training set members a probability score of one.

Next, the processor generates an invalid training set by replacing, for each of the valid training set members, the at least one actual product with a respective non-recommended product from the M products to thereby generate invalid training set members. Invalid training set members are defined as invalid training work orders including an actual work order description, an actual repair item, an actual work type, and at least one non-recommended product. The processor assigns the invalid training set members a probability score of zero. The processor then generates parameters for the classification model 210 that optimize a combination of the valid training set and the invalid training set.

The classification model 210 may be evaluated in various ways. In an embodiment, the classification model 210 is evaluated as follows. A second percentage of the completed work orders can be duplicated into a validation set. In some embodiments, the first percentage is 80% and the second percentage is 20%, although other distributions may be utilized. Wherein validation set members are defined as validation work orders including an actual work order description, an actual repair item, an actual work type, and at least one actual product, the validation set members are assigned a true probability score of one. A false validation set is then created by, for each of the validation set members, replacing the at least one actual product with a respective non-recommended product from the M products to thereby generate false validation set members. Each of the false validation set members are assigned a true probability score of zero. For each of the validation set members and each of the false validation set members, the classification model 210 is used to generate an actual probability score, and it is determined whether the actual probability score is the same as the true probability score. This result can be saved as a report or displayed in a variety of ways for further study and analysis.

The approaches and methodologies presented here can be utilized in various computer-based environments, network environments, and/or database system environments. In this regard, FIG. 5 illustrates a block diagram of an environment 610 wherein an on-demand database service might be used for purposes of supporting the subject matter described in more detail above. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 5 (and in more detail in FIG. 6) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a field technician is using a particular user system 612 to interact with system 616, that user system has the capacities allotted to that field technician. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the Internet, that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 5, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 5, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 5 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core series processor or the like. Similarly, system 616 (and additional instances of an MTS, where more than one is present) and all of their components might be operator configurable using application(s) including computer code to run using a central processing unit such as processor system 617, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
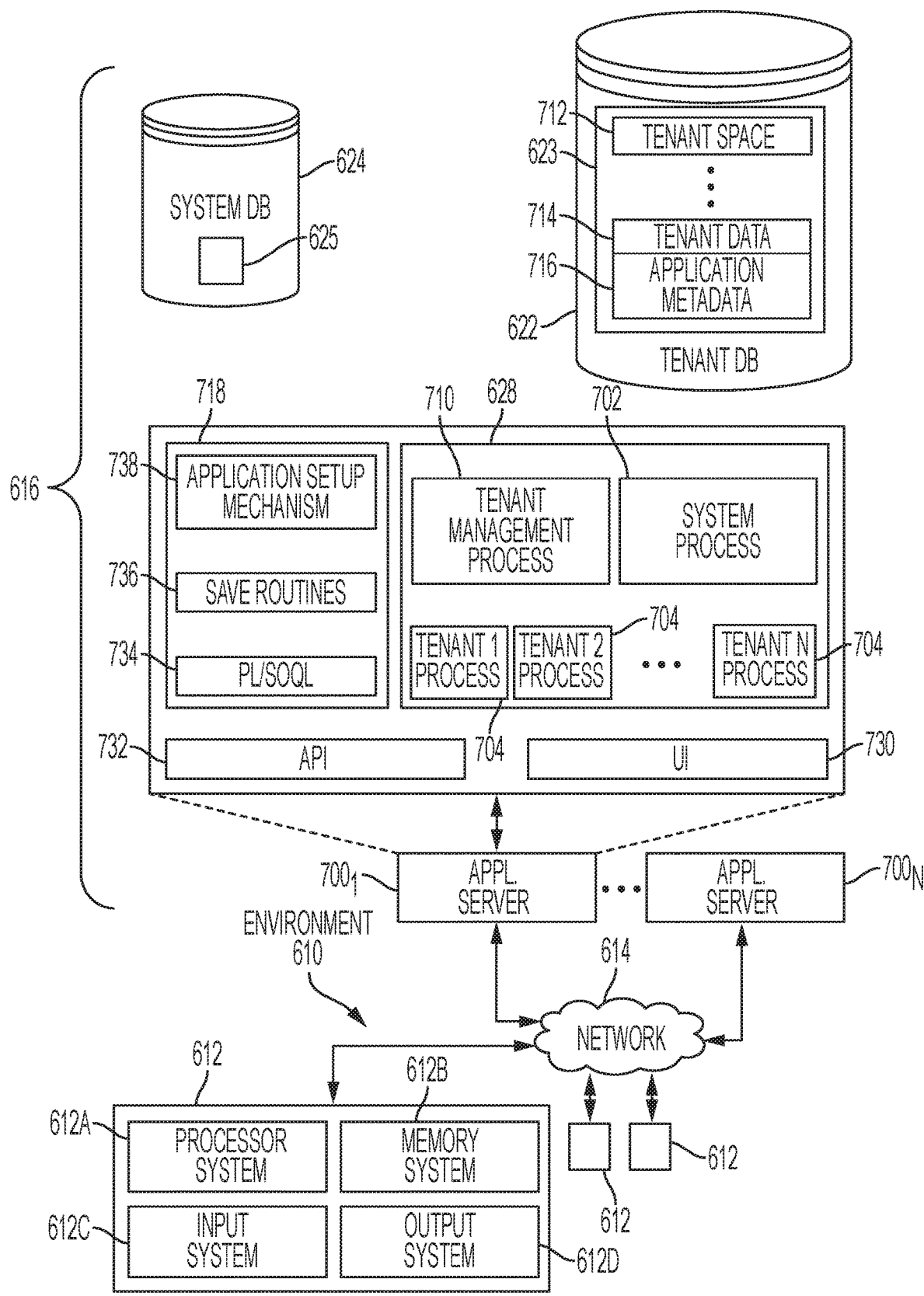
FIG. 6 is a block diagram representation of another exemplary environment in which the product recommender system might be used.

FIG. 6 also illustrates environment 610. However, in FIG. 6 elements of system 616 and various interconnections in an embodiment are further illustrated. FIG. 6 shows that user system 612 may include processor system 612A, memory system 612B, input system 612C, and output system 612D. FIG. 6 shows network 614 and system 616. FIG. 6 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 5. Regarding user system 612, processor system 612A may be any combination of one or more processors. Memory system 612B may be any combination of one or more memory devices, short term, and/or long-term memory. Input system 612C may be any combination of input devices, such as one or more keyboards, mice, trackballs, scanners, cameras, and/or interfaces to networks.

Output system 612D may be any combination of output devices, such as one or more monitors, printers, and/or interfaces to networks. As shown by FIG. 6, system 616 may include a network interface 620 (of FIG. 5) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 BIG-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each field technician uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A processor-implemented method for recommending a product, from among a plurality (M) of different products, to address a current repair item comprising:
   receiving from an input system, by a processor of a recommender system, an input case description, and a current work order that characterizes the input case description, the current work order comprising first data fields including a current work order description, the current repair item, and a current work type, filled with corresponding data input by a user interface of the input system;

accessing, by the processor, a storage device having stored therein historical work orders for the M products, each product of the M products having at least one historical work order in which it was associated therewith, the at least one historical work order comprising second data fields including a historical repair item, a historical work type, and a historical work order description, filled with corresponding data previously input by a respective user interface of a respective input system;

searching, by the processor, the historical work orders for a co-occurrence of the historical repair item matching the current repair item, and the historical work type matching the current work type;

upon finding the co-occurrence, adding the product of the M products that is associated with the historical repair item to a set of candidate products for the current work order, thereby generating N candidate products;

converting, by the processor, natural language text of one or more of the first data fields of the current work order into a first set of one or more numerical vectors;

for each of the N candidate products for the current work order:
  converting, by the processor, natural language text of one or more of the second data fields of the at least one historical work order associated with the respective candidate product into a second set of one or more numerical vectors;
  determining, by the processor, a respective similarity measure between the candidate product and the current work order based at least on the first set of one or more numerical vectors and the second set of one or more numerical vectors; and
  generating, by the processor, a respective probability score for the candidate product and the current work order based at least on the respective similarity measure, a current work type category, and popularity of the candidate product using a machine learning classification model to generate the respective probability score based at least on the first set of one or more numerical vectors and the second set of one or more numerical vectors;

ranking, by the processor, the candidate products in accordance with their probability score, resulting in a ranked list of recommended products to bring; and presenting, by the processor at a user system comprising a display, a graphical user interface (GUI) on the display, the GUI recommending a candidate product of the ranked list of recommended products that has a probability score that meets a predefined threshold to resolve the current work order.

2. The processor-implemented method of claim 1, further comprising determining the current work type category based at least on matching the current work type to supported work type categories including: repair, replace, and calibrate.

3. The processor-implemented method of claim 2, wherein:
the probability score generated for each of the N candidate products is a number between zero and one, an outcome of one indicating a positive relationship between the candidate product and the current work order, and an outcome of zero indicating a negative relationship between the candidate product and the current work order.

4. The processor-implemented method of claim 3, wherein the machine learning classification model is a random forest classifier.

5. The processor-implemented method of claim 4, wherein, for each of the N candidate products, determining the respective similarity measure between the candidate product and the current work order description includes determining a cosine similarity between the current work order description and the candidate product.

6. The processor-implemented method of claim 4, wherein, for each of the N candidate products, determining the respective similarity measure between the current work order description and the candidate product includes determining an overlapping word count between the current work order description and the candidate product.

7. The processor-implemented method of claim 4, further comprising:
training the machine learning classification model by,
  obtaining, by the processor, a set of completed work orders, stored over a duration of time, completed work orders including an actual work order description, an actual repair item, and an actual work type, a completed work order having used at least one actual product that is one of the M products;
  duplicating a first percentage of the completed work orders into a valid training set;
  assigning the valid training set members a probability score of one;
  creating an invalid training set by, for each of the valid training set members, replacing the at least one actual product with a respective non-recommended product from the M products to thereby generate invalid training set members;
  assigning the invalid training set members a probability score of zero; and
  generating parameters for the machine learning classification model that optimize a combination of the valid training set and the invalid training set.

8. The processor-implemented method of claim 7, further comprising:
duplicating a second percentage of the completed work orders into a validation set;
assigning the validation set members a true probability score of one;
creating a false validation set by, for each of the validation set members, replacing the at least one actual product with a respective non-recommended product from the M products to thereby generate false validation set members;
assigning each of the false validation set members a true probability score of zero; and
for each of the validation set members and each of the false validation set members, using the machine learning classification model to generate an actual probability score, and determining whether the actual probability score is the same as the true probability score.

9. A non-transitory computer-readable medium having stored thereon instructions that, when executed by one or more processors, are configurable to cause the one or more processors to:
receive from an input system, an input case description, and a current work order that characterizes the input case description, the current work order comprising first data fields including a current work order description, a current repair item, and a current work type, filled with corresponding data input by a user interface of the input system;

access a storage device having stored therein historical work orders for the M products, each product of the M products having at least one historical work order in which it was associated therewith, the at least one historical work order comprising second data fields including a historical repair item, a historical work type, and a historical work order description, filled with corresponding data previously input by a respective user interface of a respective input system;

search the historical work orders for a match, including a co-occurrence of the historical repair item matching the current repair item, and the historical work type matching the current work type;

upon finding a match, determine whether the product of the M products associated with the historical repair item is already in a set of candidate products for the current work order, and add the product associated with the historical repair item to the set of candidate products for the current work order when the product is not already in the set of candidate products for the current work order, thereby generating N candidate products;

convert natural language text of one or more of the first data fields of the current work order into a first set of one or more numerical vectors;

for each of the N candidate products, convert natural language text of one or more of the second data fields of the at least one historical work order associated with the respective candidate product into a second set of one or more numerical vectors and determine a respective similarity measure between the candidate product and the current work order based at least on the first set of one or more numerical vectors and the second set of one or more numerical vectors;

for each of the N candidate products, convert natural language text of one or more of the second data fields of the at least one historical work order associated with the respective candidate product into the second set of one or more numerical vectors and generate a respective probability score for the candidate product and the current work order based at least on the respective similarity measure, work type category, and popularity of the candidate product using a machine learning classification model to generate the respective probability score based at least on the first set of one or more numerical vectors and the second set of one or more numerical vectors;

rank each candidate product in accordance with its respective probability score, resulting in a ranked list of recommended products to bring; and present, at a user system comprising a display, a graphical user interface (GUI) on the display, the GUI recommending at least one candidate product of the ranked list of recommended products that has a probability score that meets a predefined threshold to resolve the current work order.

10. The non-transitory computer-readable medium of claim 9, wherein:

the probability score generated for each of the N candidate products is a number between zero and one, an outcome of one indicating a positive relationship between the candidate product and the current work order, and an outcome of zero indicating a negative relationship between the candidate product and the current work order.

11. The non-transitory computer-readable medium of claim 10, wherein the machine learning classification model is a random forest classifier.

12. The non-transitory computer-readable medium of claim 11, wherein, for each of the N candidate products, the respective similarity measure between the candidate product and the current work order description is based on a cosine similarity between the current work order description and the candidate product.

13. The non-transitory computer-readable medium of claim 11, wherein, for each of the N candidate products, the respective similarity measure between the current work order description and the candidate product is based on an overlapping word count between the current work order description and the candidate product.

* * * * *